(12) United States Patent
Ahern et al.

(10) Patent No.: US 6,520,767 B1
(45) Date of Patent: Feb. 18, 2003

(54) FUEL DELIVERY SYSTEM FOR COMBUSTING FUEL MIXTURES

(75) Inventors: Brian S. Ahern, Concord, MA (US); Charles W. Haldeman, Boxboro, MA (US)

(73) Assignee: Supercritical Combustion Corporation, Woburn, MA (US)

( * ) Notice: Subject to any disclaimer, the term of this patent is extended or adjusted under 35 U.S.C. 154(b) by 0 days.

(21) Appl. No.: 09/557,725

(22) Filed: Apr. 25, 2000

Related U.S. Application Data

(60) Provisional application No. 60/131,048, filed on Apr. 26, 1999.

(51) Int. Cl.[7] .............................. B01F 5/06; F23D 11/18
(52) U.S. Cl. .................... 431/4; 431/11; 431/354; 239/427; 239/432; 239/553.3; 239/590.5; 239/8
(58) Field of Search ............................ 431/4, 11, 354; 239/432, 427, 553.3, 590.3, 590.5; 60/737, 738; 366/340, 176.1, 181.5, 336

(56) References Cited

U.S. PATENT DOCUMENTS

| | | | |
|---|---|---|---|
| 1,441,982 A | * | 1/1923 | Heylman et al. |
| 1,474,900 A | * | 11/1923 | Goldsmith |
| 1,645,893 A | * | 10/1927 | Buckman |
| 1,826,776 A | * | 10/1931 | Gunter |
| 2,289,494 A | * | 7/1942 | Hadley et al. |
| 2,646,113 A | * | 7/1953 | Tavener |
| 3,176,921 A | | 4/1965 | De Voe |
| 3,545,492 A | | 12/1970 | Scheid |
| 3,867,092 A | * | 2/1975 | Sage et al. |
| 3,921,901 A | * | 11/1975 | Woodman |
| 4,485,968 A | | 12/1984 | Berthiaume |
| 4,543,190 A | | 9/1985 | Modell |
| 4,732,114 A | | 3/1988 | Binder |
| 5,399,015 A | * | 3/1995 | Zhi-Qiang et al. |
| 5,603,453 A | * | 2/1997 | Weaver et al. |
| 6,010,544 A | * | 1/2000 | Haldeman et al. |

FOREIGN PATENT DOCUMENTS

| | | | |
|---|---|---|---|
| DE | 197 47 247 | 7/1998 | |
| EP | 0 506 069 | 9/1992 | |
| EP | 0 593 793 | 4/1994 | |
| FR | 1 287 342 | 7/1962 | |
| FR | 2 083 112 | 12/1971 | |
| JP | 57-198912 | * 12/1982 | .................... 431/4 |
| JP | 9-159113 | * 6/1997 | .................... 431/4 |
| LU | 75 364 | 2/1977 | |
| WO | WO 99/31204 | 6/1999 | |
| WO | WO 00/00725 | 1/2000 | |

OTHER PUBLICATIONS

"Quasi–Porous Plug with Vortex Chamber," N.T.I.S. Technical Notes, vol. D, No. 1, Jan. 1, 1986, p. 76.
International Search Report, PCT/US00/11246, Oct. 2, 2000.

* cited by examiner

*Primary Examiner*—Carl D. Price
(74) *Attorney, Agent, or Firm*—Elizabeth E. Nugent; Choate, Hall & Stewart

(57) ABSTRACT

Apparatus for reducing the total pressure of a compressible fluid fuel. The apparatus includes at least two closely spaced apart constant enthalpy expansion sections, each section having at least one orifice, the orifices in adjacent sections being noncoaxial. The pressure reduction lowers flow velocity when mixed with the air to below the flame speed to promote ignition and stable combustion.

24 Claims, 4 Drawing Sheets

FUEL DELIVERY SYSTEM FOR COMBUSTING FUEL MIXTURES

The present application claims priority from U.S. Provisional Application No. 60/131,048, filed Apr. 26, 1999, which is incorporated herein by reference.

FIELD OF THE INVENTION

This invention relates to the combustion of fuels and more particularly to the efficient combustion of compressible fluid fuel.

BACKGROUND OF THE INVENTION

Efficient combustion of liquid fuels usually involves creating fine liquid droplets or vaporizing the liquid to the gaseous state and thereafter mixing the fuel with air or oxygen in order to initiate and sustain combustion. As disclosed and claimed in our co-pending United States Patent Application Serial No. 08/992,983, now U.S. Pat. No. 6,010,544, the contents of which are incorporated herein by reference, an alternative approach involves forming a supercritical water/hydrocarbon fuel mixture. As taught in that patent, a water/hydrocarbon fuel mixture is heated and pressurized to a level at or above the critical point of the mixture. At critical conditions, the mixture is a homogeneous single phase that can be combusted in a more efficient manner and with considerably reduced undesirable emissions. As further taught therein, the critical temperature of the mixture is at or above approximately 363° C. and the critical pressure is at or above 3000 psi. Optimal conditions are considered to be 390° C. and 4000 psi.

As disclosed and claimed in our co-pending U.S. patent application Ser. No. 09/359,509, now U.S. Pat. No. 6,240,893, the contents of which are incorporated herein by reference, another alternative approach involves forming a sub-critical water/hydrocarbon fuel mixture which is at a pressure that is below the critical pressure charactistic of the mixture and is at a temperature that is at least the greater of about 250° C. and the boiling point of water at the mixture pressure. As taught in that application, a water/hydrocarbon fuel mixture is pressurized to a level below the critical point of the mixture and heated to a temperature that is at least the greater of about 250° C. and the boiling point of water at the mixture pressure. The specified sub-critical mixture provides a local environment of water molecules, tending to limit hydrocarbon polymerization and other undesrable side reactions and keeping the hydrocarbon from precipitating from the mixture. At these specified sub-critical conditions, combustion of the mixture provides a "cleaner" combustion with considerably reduced particulate matter and oxides of nitrogen emissions compared with that which results from the combustion of otherwise comparable water-hydrocarbon mixtures at temperatures below the boiling point of water at the sub-critical pressure employed.

In some applications, the high pressure and temperature of the supercritical mixture or the above-specified subcritical mixtures are directly suitable for injection into a combustion chamber. In other applications, the high pressure of these water/hydrocarbon fuel mixtures result in subsequent fuel/air flow velocities higher than the flame speed of the combustible mixture. Flow velocities which far exceed the flame speed lead to difficulties with ignition and flame stabilization. Thus, for applications such as nearly atmospheric pressure oil burners the fuel/air mixture flow velocity must be reduced by lowering both the pressure and velocity.

A valve could be used to lower the flow velocity since it provides for a variable size orifice, but some of total pressure ahead of the valve is recovered in the velocity downstream of the valve and a valve also introduces increased thermal mass and dwell time. Furthermore, after the fluid passes through the valve its temperature and pressure change dramatically and the fluid's metastable condition can be adversely affected by these changes in the length between the valve and the combustion process. Other solutions to for lowering flow velocity are thus needed.

SUMMARY OF THE INVENTION

In one aspect, the fuel system of the invention includes structure containing a mixture of water and hydrocarbon fuel in which the mixture is at or above its critical temperature and pressure such that the mixture is a homogeneous single phase. Apparatus is provided for rapidly reducing the total pressure of the mixture prior to delivery to a combustion chamber. In another aspect, the invention is a process for combusting a hydrocarbon/water mixture including the steps of producing a mixture of water and hydrocarbon fuel at or above its critical point such that the mixture is a homogeneous single phase and rapidly reducing the pressure of the mixture without an excessive change in the velocity. Thereafter, the reduced pressure mixture is delivered into a combustion chamber. In this aspect, it is preferred that the mixture be maintained at a temperature above 363° C. and at a pressure above 3000 psi before reduction. It is preferred that the pressure reduction occur within a time period less than 1 millisecond prior to being delivered to the combustion chamber and that the pressure be reduced to below 200 psi for atmospheric combustion. The temperature of the supercritical mixture may be in the range of 363° C.–450° C. and in a pressure range of 3000 psi 4500 psi. It is also preferred that the pressure reduction take place within a time period in the range of 0.1–2 milliseconds prior to being delivered to a combustion chamber and that the total pressure be reduced to a range of 2 to 10 times the pressure in the combustion chamber.

In another aspect, the fuel system of the invention includes structure containing a sub-critical water/hydrocarbon fuel mixture which is at a pressure that is below the critical pressure characteristic of the mixture and is at a temperature that is at least the greater of about 250° C. and the boiling point of water at the mixture pressure. Apparatus is provided for rapidly reducing the pressure of the mixture prior to delivery to a combustion chamber. In another aspect, the invention is a process for combustion of a sub-critical hydrocarbon/water mixture of the above-specified characteristics and rapidly reducing the pressure of the mixture. Thereafter, the reduced pressure mixture is delivered into a combustion chamber. In this aspect, it is preferred that the mixture be maintained at a temperature that is between about 25° C. and about 100° C. greater than the boiling point of water at the mixture pressure. It is preferred that the pressure reduction occur within a time period less than 1 millisecond prior to being delivered to the combustion chamber and that the pressure be reduced to below 200 psi for combustion at up to 10 atmospheres of pressure. It is also preferred that pressure reduction take place within a time period in the range of 0.1–2 milliseconds prior to being delivered to a combustion chamber and that the pressure be reduced to a range of 200–500 psi. for combustion at 10 to 20 atmospheres Apparatus is provided for rapidly reducing the total pressure of the mixture prior to delivery to a combustion chamber. In another aspect, the invention is a process for combusting a hydrocarbon/water mixture including the steps of producing a supercritical or specified sub-critical mixture of water and hydrocarbon fuel and rapidly reducing the pressure of the mixture. Thereafter, the reduced pressure mixture is delivered into a combustion chamber. In this aspect, it is preferred that a supercritical mixture be maintained at a temperature above 363° C. and at a pressure above 3000 psi. It is preferred that the pressure reduction occur within a time period less than 1 millisecond prior to being delivered to the combustion chamber and that the pressure be reduced to below 200 psi for combustion at 1 to 10 atmospheres. The temperature of the supercritical mixture may be in the range of 363° C.–450° C. and in a pressure range of 3000 psi–4500 psi. It is also preferred that the pressure reduction take place within a time period in the range of 0.1–2 milliseconds prior to being delivered to a combustion chamber and that the pressure be reduced to a range of 200–500 psi for combustion at 10 to 20 atmospheres.

In another aspect, the apparatus for reducing the total pressure of the supercritical or specified sub-critical mixture comprises at least two closely spaced apart constant enthalpy expansion sections, each section having at least one orifice with orifices in adjacent sections being non-coaxial. Each section defines an enclosed volume and the size of the orifices increases in a flow direction in adjacent sections. It is preferred that the orifice size at each section be selected to provide sonic or choked flow at each section. In a preferred embodiment, the first section includes a single orifice and subsequent sections include at least two orifices and preferably three orifices. Also in a preferred embodiment the pressure downstream of the orifice is reduced to approximately one-third of the upstream pressure at each section. In this embodiment, the volumes between orifices serve to dissipate velocity of expansion by local shock waves, thus reducing total as well as static pressures.

In yet another aspect, the apparatus for reducing the pressure of the supercritical water/hydrocarbon fuel mixture includes three closely spaced apart constant enthalpy expansion sections for receiving the mixture. A first section includes a single orifice located on a central axis of the first section and a second section includes three orifices located off the central axis. A third section includes six orifices arranged on a substantially spherical surface. This device provides the mixture at pressures near 1 atmosphere and velocity suitable for mixing with air and combusting.

This invention relates to the combustion of compressible fluid fuels, including but not limited to the above-described supercritical or sub-critical water/hydrocarbon fuel mixtures. Compressible fluid fuels (e. g., methane or "natural gas") are at least in part gas like (i. e., compressible) at ambient conditions and typically are used by being injected into the cylinder of a reciprocating engine at near top dead center. The space available for this injection is so limited that the gaseous fuel must be delivered under high pressure. Injection of this gaseous fuel under high pressure directly into a cylinder can result in a gas jet, which transits the cylinder too rapidly to entrain the appropriate amount of air. Delivery of the gaseous fuel to the cylinder from the injector through apparatus of this invention with more than one set of orifices in series can eliminate or minimize this problem.

The multisection cascade orifice nozzle provides for relieving the momentum of the high-pressure jet while maintaining the intimate mixing of water and oil under the supercritical conditions. The invention produces the correct fluid velocity distribution by interacting the flow from the final orifice it with the combustion air mass. The momentum exchange to the air also includes mixing so that the proper mixture of air and fuel is obtained locally.

In contrast, the mixture issuing from a single orifice is moving so fast that it entrains too much air and is too lean for stable combustion. Pressure reductions from the 4000-psi range down to the 100-psi range can be achieved within a length of approximately 1-inch and the time spent in this volume can be reduced to the millisecond range for high flow rates. Metastable conditions at reduced pressures can be sustained long enough to begin and maintain stable combustion.

BRIEF DESCRIPTION OF THE DRAWINGS

The invention is described with reference to the several figures of the drawing, in which.

DETAILED DESCRIPTION

As discussed above, the flow velocity of compressible fluid fuels must often be reduced to achieve a stable flame. However, the pressure must be reduced rapidly and over a short distance so that the combustion advantages of the supercritical or specified sub-critical mixtures are not sacrificed and so that excessive velocity is not generated. As will be appreciated by those skilled in the art, as pressure is reduced, thermodynamic driving forces tend to cause the mixture to revert to liquid water and liquid fuel droplets. These thermodynamic driving forces are in competition with kinetic conditions. That is to say, there is a finite amount of time required to accomplish a phase change and the reversion to liquid water and liquid fuel droplets is limited by diffusion of each of the species. Thus, in order to preserve the combustion advantages provided by the supercritical state, pressure, and hence flow velocity, must be reduced rapidly so that combustion can occur before the homogeneous single phase of the supercritical mixture reverts to separate phases for water and fuel or the specified sub-critical conditions are no longer maintained.

Accordingly, it is important to lower the flow velocity of the supercritical and specified sub-critical fuel/water mixture from its reservoir to a combustion chamber by rapidly reducing its total pressure. The total pressure is defined as the sum of the static pressure, P, and the velocity head, $\frac{1}{2}\rho \times V^2/(144\ g_c)$, where:

P=static pressure, psi
ρ=density, $lb_m/ft^3$
V=velocity, ft/sec, and
$g_c$ a conversion constant, ft $lb_m/lb_f$ $sec^2$ The total pressure of a mixture will essentially be the static pressure if the contribution of the velocity term is negligible, as will be the case if, at the point of measurement, the fluid is essentially quiescent. However, the total pressure and static pressure would be significantly different, if in the mixture at the point of measurement, the fluid is significantly in motion so that the velocity term is relatively large.

The methods and structures of the present invention allow rapid reduction of flow velocity of compressible fluid fuels without loss of their beneficial combustion properties.

Figure 1A:
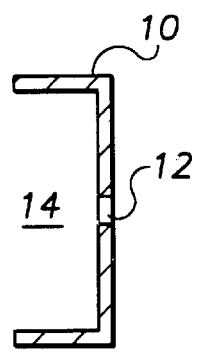
FIGS. 1a and 1b are cross-sectional and end views of a first section of a 4-stage pressure reducing apparatus of the invention.
Figure 1B:
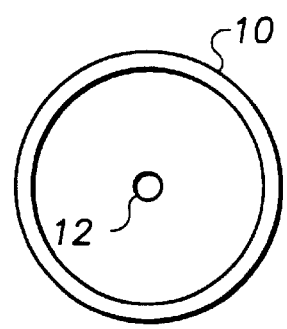

With reference to FIGS. 1a and 1b a first section 10 includes a single orifice 12 and defines a small volume 14. A suitable orifice 12 diameter is 0.016 inches. A suitable diameter for the section 10 is 0.375 inches. A suitable depth for the recess defining the volume 14 is 0.060 inches and the length of the section 10 is approximately ⅛ of an inch. A suitable material for section 10 is 316 stainless steel.

Figure 2A:
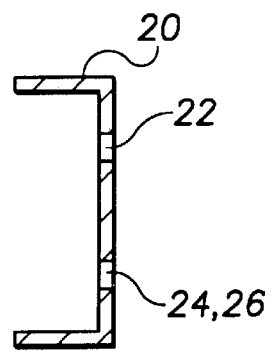
FIGS. 2a and 2b are cross-sectional and end views of a second section of the 4-stage pressure reducing apparatus.
Figure 2B:
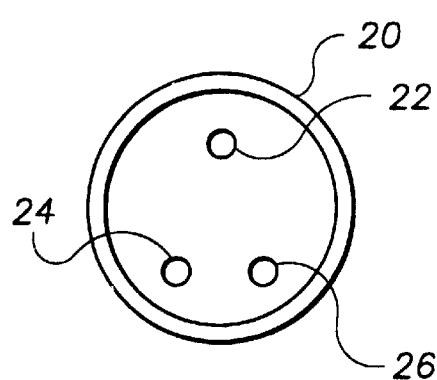

A second section 20 is shown in FIGS. 2a and 2b. As shown in FIG. 2b, the section 20 includes three orifices 22, 24 and 26. A suitable diameter for the orifices 22, 24 and 26 is 0.01732 inch. It is also suitable that the orifices 22, 24 and 26 be arranged on a 0.080 inch bolt circle. Other suitable dimensions are as set forth with respect to section in FIG. 1a.

Figure 3A:
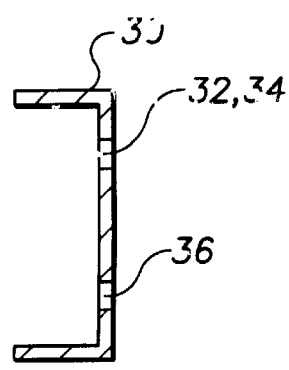
FIGS. 3a and 3b are cross-sectional and end views of a third section of the 4-stage pressure reducing apparatus.
Figure 3B:
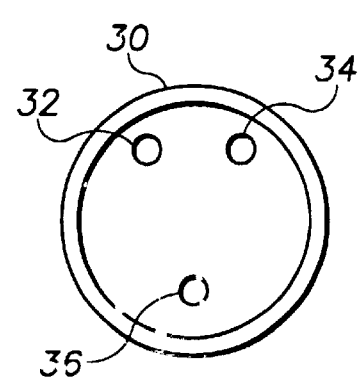

A third section 30 is shown in FIGS. 3a and 3b. Section 30 includes three orifices 32, 34 and 36 with diameters of 0.030 inches. These orifices are also located on a 0.080 inch bolt circle. The dimensions of section 30 are comparable to those of sections 10 and 20.

Figure 4A:
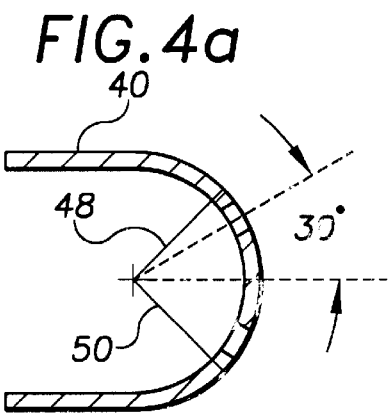
FIGS. 4a and 4b are cross-sectional and end views of a fourth section of the 4-stage pressure reducing apparatus.
Figure 4B:
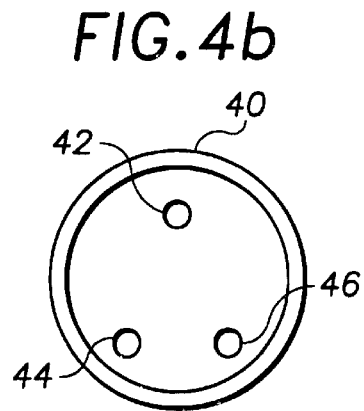

A fourth section 40 is shown in FIGS. 4a and 4b. The section 40 has a generally spherical configuration and includes three orifices 42, 44 and 46. The orifices 42, 44 and 46 may have a diameter of 0.052 inches. These orifices may be located approximately 30° from an axis of the section 40 as shown in FIG. 4a. A suitable dimension for an outer radius 48 is 0.188 inches and a suitable dimension for an inner radius 50 is 0.158 inches. The length of the section 40 is approximately ¼ of an inch.

Figure 5:
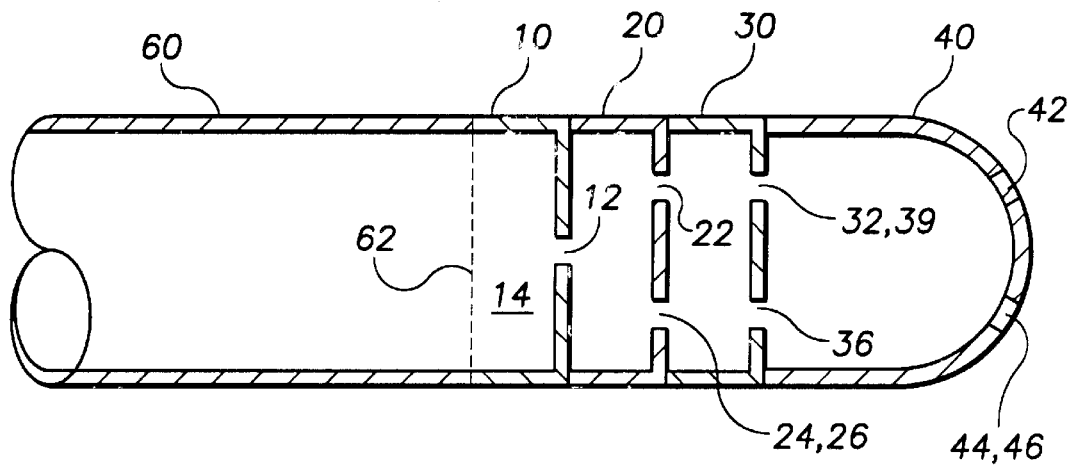
FIG. 5 is a cross-sectional view of the assembled sections forming the 4-stage pressure reducing apparatus.

FIG. 5 shows pressure-reducing apparatus 60 of the invention with the various sections assembled to form a unitary structure. It is preferred that the sections 10, 20, 30 and 40 be welded together to form the unitary structure 60. It is important that the sections be assembled to preserve the arrangement of the orifices as shown in the previous figures so that the orifices are not coaxial. For example, the section 20 is assembled with the orifice 22 adjacent to the orifices 32 and 34 of section 30 thereby resulting in a non-coaxial cascade of nozzle orifices. In a preferred embodiment, a 0.005 screen 62 is positioned before section 10 to protect the orifice 12 from becoming blocked by dirt in the system.

Orifice sizes are selected to assure a pressure ratio from section to section sufficient to provide choking of the flow at each stage. In this manner, an upstream orifice will be the flow limiting device and the number of orifices in the series cascade is chosen to obtain a desired total pressure ratio. The area ratio between successive orifices should be the inverse of the overall desired pressure ratio. That is, if the pressure ratio after an orifice is one-third the pressure before the orifice, the area of the successive orifice should be three times that of the first orifice.

For mixtures for which the thermodynamic properties are well known, the pressure ratios and orifice areas can be more accurately calculated. All orifices have sonic or smaller pressure ratios and the orifice aggregate area must pass the same mass flow at each stage. As an example, in order to drop from approximately 4000 psi to approximately 49 psi, four sections are suitable in the cascade. If the orifice 12 in the section 10 is 0.016 inches, the pressure will drop from 4000 psia to 1333 psi after passing through the orifice 12. With the orifices 22, 24 and 26 in section 20 having diameters of 0.01732 inches the pressure will drop from 1333 psia to 444 psi. If the orifices 32, 34 and 36 in section 30 have diameters of 0.030 inches the pressure will drop from 444 psi to 148 psia. Finally, if the orifices 42, 44 and 46 of the section 40 have diameters of 0.052 inches, the pressure will drop from 148 psi to 49 psia. At this pressure level mixing with air in a burner tube is much easier. The cascade nozzle shown in FIG. 5 accomplishes this pressure drop in less than ¾ inch. The small volumes such as the volume 14 separating the orifices can be cylindrical volumes having a diameter of four individual hole diameters and a length of at least two hole diameters. The final pressure can be measured by a sufficiently small pitot tube placed axially in the jet from one of the orifices 42, 44 and 46. The total pressure will be significantly different from the 4000 psia measured in a single stage device. At this static pressure level mixing with air in a burner tube is much easier and the total pressure of the mixture delivered to the combustion chamber will be significantly reduce to about 49 psia.

In operation, a supercritical mixture of a hydrocarbon fuel and water is introduced into the left side of the structure 60 shown in FIG. 5. A suitable mixture is 5–70% water with a hydrocarbon fuel. Supercritical conditions for the mixture are achieved at temperatures in the range of approximately 363° C.–450° C. and at a pressure range of approximately 3000 psia 4500 psia. As the supercritical mixture passes through the successive stages of orifices, pressure will be reduced so that when the mixture exits through the orifices 42, 44 and 46 the mixture is at a pressure less than 500 psia and preferably less than 200 psia. In addition, the lower pressure will result in flow velocities when mixed with air of less than a resulting flame velocity to assure ignition and stable burning. As will be appreciated by those skilled in the art, the section 40 will be positioned to introduce the mixture into a combustion chamber or other burner.

The cascade nozzle shown in FIG. 5 accomplishes this pressure drop in less than ¾ inch. The small volumes such as the volume 14 separating the orifices can be cylindrical volumes having a diameter of four individual hole diameters and a length of at least two hole diameters. In practice it has been found that 4-stage nozzles do not provide as good mixing or burning as 3-stage nozzles (shown in FIGS. 6 through 9) which are therefore preferred. A 4-stage nozzle could, however, be useful at high altitudes. The three-stage cascade nozzle in the following embodiment has worked well in an Allison T-63 combustor operated at atmospheric pressure in static burn tests.

Figure 6A:
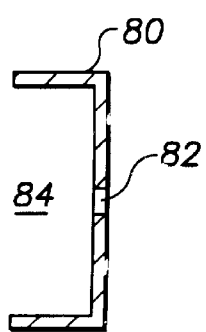
FIGS. 6a and 6b are cross-sectional and end views of a first section of a 3-stage pressure reducing apparatus of the invention.
Figure 6B:
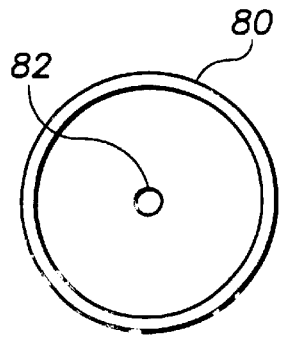

With reference to FIGS. 6a and 6b a first section 80 includes a single orifice 82 and defines a small volume 84. A suitable orifice 82 diameter is 0.016 inches for a flow of 200 g/min of fuel and 170 g/min of water. A suitable diameter for the section 80 is 0.375 inches. A suitable depth for the recess defining the volume 84 is 0.060 inches and the length of the section 80 is approximately ⅛ of an inch. A suitable material for section 80 is 304 stainless steel.

Figure 7A:
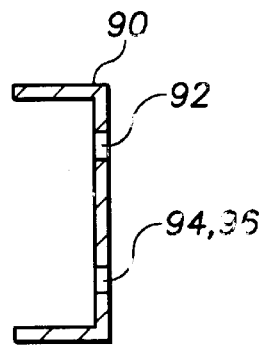
FIGS. 7a and 7b are cross-sectional and end views of a second section of the 3-stage pressure reducing apparatus.
Figure 7B:
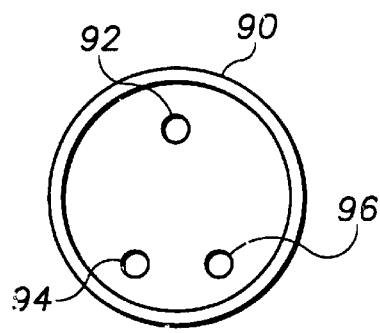

A second section 90 is shown in FIGS. 7a and 7b. As shown in FIG. 7b, the section 40 includes three orifices 92, 94 and 96. A suitable diameter for the orifices 92, 94 and 96 is 0.01732 inch. It is also suitable that the orifices 92, 94 and 96 be arranged on a 0.080-inch bolt circle. Other suitable dimensions are as set forth with respect to section 80 in FIG. 6a.

Figure 8A:
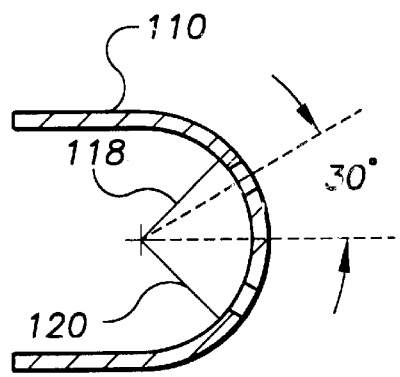
FIGS. 8a and 8b are cross-sectional and end views of a third section of the 3-stage pressure reducing apparatus.
Figure 8B:
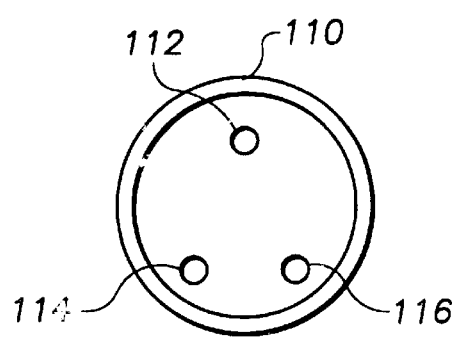

A third section 110 is shown in FIGS. 8a and 8b. The section 110 has a generally spherical configuration and includes three orifices 112, 114 and 116. The orifices 112, 114 and 116 may have a diameter of 0.030 inches. These orifices may be located approximately 30° from an axis of the section 110 as shown in FIG. 8a. A suitable dimension for an outer radius 118 is 0.188 inches and a suitable dimension for an inner radius 120 is 0.158 inches. The length of the section 110 is approximately ¼ of an inch. Alternatively 6 holes of 0.021 inches diameter could be used for the last stage.

Figure 9:
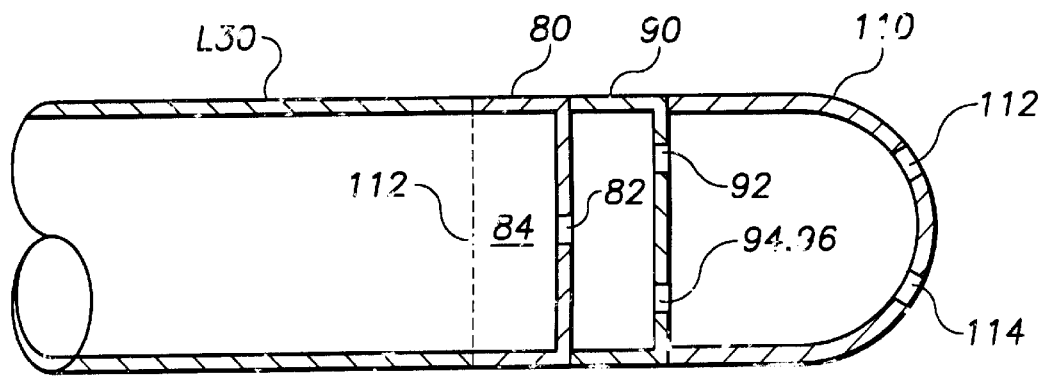
FIG. 9 is a cross-sectional view of the assembled sections forming the 3-stage pressure reducing apparats.

FIG. 9 shows pressure-reducing apparatus 130 of the invention with the various sections assembled to form a unitary structure. It is preferred that the sections 80, 90, 110 and 130 be welded together to form the unitary structure 60. It is important that the sections be assembled to preserve the arrangement of the orifices as shown in the previous figures so that the orifices are not coaxial. For example, the section 90 is assembled with the orifice 92 adjacent to the orifices 92, 94 and 96 of section 110 thereby resulting in a non-coaxial cascade of nozzle orifices. Should the orifices be coaxial, the kinetic energy of the first orifice jet will not be completely dissipated and more total pressure will be recovered. In a preferred embodiment, a 0.005" screen 112 is positioned before section 80 to protect the orifice 82 from becoming blocked by dirt in the system.

Orifice sizes are selected to assure a pressure ratio from section to section sufficient to provide choking of the flow at each stage. In this manner, an upstream rim orifice will be the flow limiting device and the number of orifices in the series cascade is chosen to obtain a desired total pressure ratio. The area ratio between successive orifices should be the inverse of the overall desired static pressure ratio. That is, if the static pressure ratio after an orifice is one-third the static pressure before the orifice, the area of the successive orifice should be three times that of the first orifice. As an example, in order to drop the total pressure of a supercritical fuel/water mixture of from approximately 4000 psia to approximately 49 psia, four sections are preferred in the cascade. Because the velocity drops to zero on a macroscopic scale in each interorifice volume, the static pressure equals the total pressure in areas away from the jet.

To calculate the pressures in the 3-stage cascade nozzle the pressure ratio. $P_{downstream}/P_{upstream}$, across each orifice should be smaller than that required to produce sonic flow for air, which is a nearly ideal gas. This ratio for air is 0.528. Because of the non-ideal nature of the complex steam-oil mixture, a ratio of 0.333 to guarantee sonic flow is selected in this non-ideal situation. To the extent density is proportional to pressure, 3 times the area is then required to pass the same flow at ⅓ the pressure. The orifice size for the first embodiment (a three-stage nozzle) described below is selected in this manner.

Cascade nozzles were constructed having two and three stages of expansion respectively and were tested in an Allison T-63 jet turbine combustor exhausting to atmospheric pressure. Both operated with clear, steady flames over a wide range of equivalence ratios. The 3-stage nozzle was intended for operation at 1 atmosphere and the 2-stage nozzle for operation at higher pressures. At the one atmosphere test condition the three stage nozzle had a somewhat wider range of stable operation than the two stage nozzle.

Figure 10:
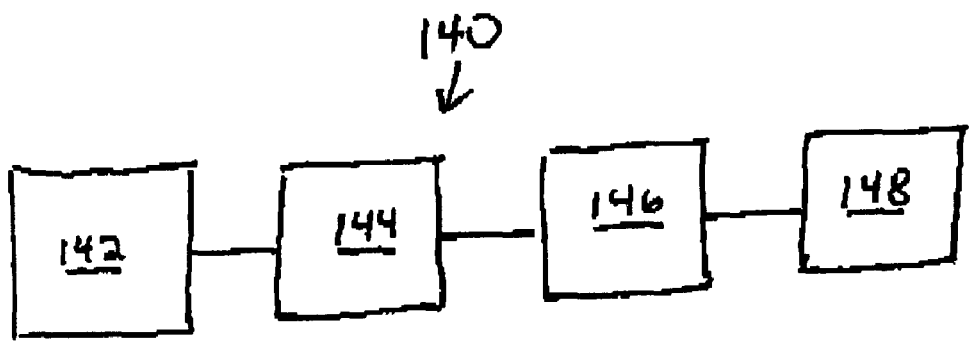
FIG. 10 is a schematic representation of a fuel delivery system according to the invention.

FIG. 10 shows a schematic representation of a fuel delivery system 140 of this invention. The system includes a source of a mixture of water and hydrocarbon fuel 142 (the mixture is either (i) at or above the mixture critical point such that the mixture is a homogeneous single phase or (ii) characterized by a critical pressure, the mixture being at a pressure that is below the critical pressure of the mixture and being at a temperature that is at least the greater of 250° C. and the boiling point temperature of water at the mixture pressure). The mixture may be pressurized and heated to these temperatures by conventional means (e.g., a dual piston metering pump and transferred heat from an exhaust manifold of an engine or auxiliary electric heaters) as disclosed in U.S. Pat. No. 6,010,544 noted above, or pressurized by any of the gear or piston pumps and heated by any the electrical, process fluid or other heating sources, each as taught in U.S. Pat. No. 6,240,883, also noted above.) The system also comprises an apparatus 144 for rapidly reducing the pressure of the mixture and a delivery apparatus 146 for introducing the reduced pressure mixture into combustion chamber 148.

The embodiments described above are entirely exemplary and are not limiting as to their effect on the appended claims. For example, each of the sections may have a single orifice as long as they are not coaxially oriented. Structure may also be provided to provide a swirling air mass within the structure 60, such as by drilling holes in sections illustrated in FIGS. 2a, 3a and 4a at 45° angles to the plane of the sectional view instead of the 90° angles shown to create a tangential swirling velocity in the volume chamber. The angular direction may then be reversed in successive plates. To provide better mixing over a wider area of the flow the number and angular orientation of the holes in the last stage nozzle can be changed as long as the total area is maintained. Physical dimensions given are specific only to particular embodiments of the invention.

It is intended that all modifications and variations of the embodiments disclosed herein be included within the scope of the appended claims.

What is claimed is:

1. Fuel delivery system comprising:
    a source of a mixture of water and hydrocarbon fuel, the mixture being at or above the mixture critical point such that the mixture is a homogeneous single phase;
    apparatus for rapidly reducing the total pressure of the mixture; and
    delivery apparatus for introducing the reduced pressure mixture into a combustion chamber.

2. The system of claim 1, wherein the static pressure component of the total pressure is reduced to below approximately 200 psi and said combustion chamber is at pressure of about 1 to 10 atmospheres.

3. The system of claim 1, wherein the static pressure component of the total pressure is reduced to between about 200 and 500 psi and said combustion chamber is at pressure of about 10 to 20 atmospheres.

4. The system of claim 2 or 3, wherein the total pressure is reduced in less than 2 milliseconds.

5. The system of claim 2 or 3, wherein the total pressure is reduced in the range of 0.1–2 milliseconds.

6. The system of claim 1, wherein the apparatus for reducing the pressure of the mixture comprises at least two closely spaced apart constant enthalpy expansion sections, each section having at least one orifice, the orifices in adjacent sections being non-coaxial.

7. The system of claim 6, wherein each section defines an enclosed volume.

8. The system of claim 6, wherein the combined area of the orifices increases in the flow direction in adjacent sections.

9. The system of claim 8, wherein the orifice size at each section is selected to provide sonic flow at each section.

10. The system of claim 6, wherein a first section includes a single orifice and subsequent sections include at least two orifices.

11. The system of claim 6, wherein the total pressure is reduced to one-third at each section.

12. Apparatus for reducing the pressure of compressible fluid fuel-water mixture comprising;

three closely spaced apart constant enthalpy expansion sections for receiving the mixture;

a first of said sections including a single orifice located on a central axis of the section;

a second of said sections including three orifices located off the central axis; and a third of said sections including three or more orifices arranged on a substantially spherical surface and angularly offset with respect to the orifices in the second section, the combined area of the orifices in the third section being 2 to 4 times the combined area of the orifices in the second section.

13. Combustion process comprising:

forming a water/hydrocarbon fuel mixture, the mixture at or above its critical point such that the mixture is a homogeneous single phase;

rapidly reducing the total pressure of the mixture; and delivering the reduced pressure mixture into a combustion chamber.

14. Fuel delivery system comprising:

a source of a mixture of water and hydrocarbon fuel, said mixture characterized by a critical pressure, the mixture being at a pressure that is above about 10 atmospheres and below the critical pressure of the mixture and being at a temperature that is at least the greater of about 250° C. and the boiling point temperature of water at the mixture pressure, apparatus for rapidly reducing the total pressure of the mixture; and delivery apparatus for introducing the reduced pressure mixture into a combustion chamber.

15. The system of claim 14 wherein the static pressure component of the total pressure is reduced to between about 200 and 500 psig and said combustion chamber is at pressure of about 10 to 20 atmospheres.

16. The system of claim 15 wherein the pressure is reduced in less than 2 milliseconds.

17. The system of claim 15 wherein the pressure is reduced in the range of 0.1–2 milliseconds.

18. The system of claim 14 wherein the apparatus for reducing the pressure of the mixture comprises at least two closely spaced apart constant enthalpy expansion sections, each section having at least one orifice, the orifices in adjacent sections being non-coaxial.

19. The system of claim 18 wherein each section defines an enclosed volume.

20. The system of claim 18 wherein the size of the orifices increases in the flow direction in adjacent sections.

21. The system of claim 18 wherein the orifice size at each section is selected to provide sonic flow at each section.

22. The system of claim 21 wherein a first section includes a single orifice and subsequent sections include at least two orifices.

23. The system of claim 22 wherein the pressure is reduced by one-third at each section.

24. Combustion process comprising:

forming a subcritical water/hydrocarbon mixture characterized by a critical pressure, the mixture being at a pressure that is above about 10 atmospheres and below the critical pressure of the mixture and being at a temperature that is at least the greater of about 250° C. and the boiling point temperature of water at the mixture pressure;

rapidly reducing the total pressure of the mixture; and delivering the reduced pressure mixture into a combustion chamber.

* * * * *